(12) United States Patent
Zhou et al.

(10) Patent No.: US 12,338,805 B2
(45) Date of Patent: Jun. 24, 2025

(54) THRUST-QUANTITATIVELY-CONTROLLABLE AND SELF-NEUTRALIZABLE KAUFMAN ION THRUSTER AND USE METHOD THEREOF

(71) Applicant: Space Engineering University, Beijing (CN)

(72) Inventors: Siyin Zhou, Beijing (CN); Wansheng Nie, Beijing (CN); Yunfan Yang, Beijing (CN); Zitong Wang, Beijing (CN); Xinhui Lin, Beijing (CN); Danyang Li, Beijing (CN); Peng Wang, Beijing (CN)

(73) Assignee: Space Engineering University, Beijing (CN)

( * ) Notice: Subject to any disclaimer, the term of this patent is extended or adjusted under 35 U.S.C. 154(b) by 49 days.

(21) Appl. No.: 18/460,611

(22) Filed: Sep. 4, 2023

(65) Prior Publication Data
US 2024/0418157 A1     Dec. 19, 2024

(30) Foreign Application Priority Data

Jun. 15, 2023    (CN) .......................... 202310709828.3

(51) Int. Cl.
    *F03H 1/00*          (2006.01)
    *B64G 1/40*          (2006.01)

(52) U.S. Cl.
    CPC ........... *F03H 1/0043* (2013.01); *B64G 1/413* (2023.08)

(58) Field of Classification Search
    CPC ..................................................... F03H 1/0043
    See application file for complete search history.

(56) References Cited

U.S. PATENT DOCUMENTS

| | | | | |
|---|---|---|---|---|
| 4,838,021 A * | 6/1989 | Beattie | ................. | F03H 1/0043 60/202 |
| 5,548,953 A * | 8/1996 | Hedges | ................. | F03H 1/0043 60/202 |
| 6,250,070 B1 * | 6/2001 | Kreiner | ................. | F03H 1/0043 60/202 |

\* cited by examiner

*Primary Examiner* — David P. Olynick
(74) *Attorney, Agent, or Firm* — JCIPRNET (57) ABSTRACT

The present disclosure relates to the technical field of space electric propulsion of spacecrafts, and discloses a thrust-quantitatively-controllable and self-neutralizable Kaufman ion thruster and a use method thereof. The Kaufman ion thruster includes a discharge chamber, a central cathode, a gas supply assembly, a steel magnetic assembly, an insulating barrier and a grid system, wherein the central cathode is coaxially inserted in the center of a front panel; the gas supply assembly includes an electronegative working substance gas source, a conventional working substance gas source, N electronegative working medium gas supply pipes and N working medium gas supply pipes; the insulating barrier includes a central connecting rod and 2N fins. Self-neutralization can be achieved without the need of neutralizers. In addition, the center-oriented thrust modes can be used for spacecraft orbit control; and the eccentric thrust mode can be used for spacecraft attitude adjustment.

10 Claims, 2 Drawing Sheets

THRUST-QUANTITATIVELY-CONTROLLABLE AND SELF-NEUTRALIZABLE KAUFMAN ION THRUSTER AND USE METHOD THEREOF

CROSS-REFERENCE TO RELATED APPLICATION

This application claims the priority benefit of China application serial no. 202310709828.3, filed on Jun. 15, 2023. The entirety of the above-mentioned patent application is hereby incorporated by reference herein and made a part of this specification.

BACKGROUND

Technical Field

The present disclosure relates to the technical field of space electric propulsion of spacecrafts, and particularly relates to a thrust-quantitatively-controllable and self-neutralizable Kaufman ion thruster and a use method thereof.

Description of Related Art

At present, ion thrusters play an important role in spacecraft attitude and orbit control due to their advantages of low thrust, high specific impulse and long service life and the like. Among them, Kaufman electric thrusters are the most widely used ion thrusters.

However, in the process of using an existing Kaufman ion thruster (Electron bombardment ion thruster), there are still three problems to be improved:

1. The Kaufman ion thruster includes a main cathode, gas supply pipes, a discharge chamber, grids, neutralizers and other parts, where separate neutralizers arranged near the grid emit electrons to neutralize ion beam currents drawn from the grids, so as to avoid that positively charged ions are attached to a spacecraft, which causes potential imbalance of the spacecraft and thus affects the normal operation of the spacecraft. However, the existence of the neutralizers will increase the complexity of the entire system, increase the structure size, and deteriorate the symmetry, and the energy consumption and ablation problems of the neutralizers will have a significant impact on the reliability and service life of an entire propulsion system.
2. The Kaufman ion thruster achieves thrust fluctuation mainly by regulating a propellant flow, but the flow change will affect the plasma generation characteristics and ion beam current derivation characteristics of the discharge chamber, so that the flow is not proportional to the thrust. Therefore, it is generally difficult to achieve the accurate thrust control by changing the flow. In space missions represented by gravitational wave detection and high-resolution earth observation and the like, an extremely high-precision adjustment on the thruster is required to be achieved, and to solve the accurate thrust control of the Kaufman ion thruster is of great significance to the applications of the thruster to the accurate attitude and orbit control of such spacecrafts.
3. With regard to future deep space exploration, it is necessary to develop high-thrust electric propulsion devices. However, the size of the Kaufman ion thruster, limited by the rigidity of grid elements of an ion optical system, is difficult to be large, which affects the development of large-diameter thrusters, resulting in difficulty in increasing thrust significantly.

SUMMARY

The technical problem to be solved by the present disclosure is to, in view of the deficiencies in the prior art, provide a thrust-quantitatively-controllable and self-neutralizable Kaufman ion thruster and a use method thereof. According to the thrust-quantitatively-controllable and self-neutralizable Kaufman ion thruster and the use method thereof provided by the present disclosure, self-neutralization can be achieved without the need of neutralizers, thereby solving the problem of an increase in structural complexity caused by the neutralizers. At the same time, there are also center-oriented thrust modes for orbit control and eccentric thrust modes for attitude adjustment.

In order to solve the above technical problems, the present disclosure adopts the following technical solutions:

a thrust-quantitatively-controllable and self-neutralizable Kaufman ion thruster includes a discharge chamber, a central cathode, a gas supply assembly, a steel magnetic assembly, an insulating barrier and a grid system.

The discharge chamber is open at the tail end, and provided with a front panel at the front end.

The central cathode is coaxially inserted in the center of the front panel.

The gas supply assembly includes N electronegative working medium gas supply pipes and N working medium gas supply pipes, where $N \geq 2$.

The N electronegative working medium gas supply pipes and the N working medium gas supply pipes are arranged on the front panel on the periphery of the central cathode in a uniformly staggering manner.

The steel magnetic assembly is configured such that a ring cusp field is formed in the discharge chamber.

The insulating barrier includes a central connecting rod and 2N fins; where the central connecting rod is coaxially inserted in the discharge chamber, and the 2N fins are uniformly arranged along the circumference of the central connecting rod, and divide the discharge chamber into 2N discharge areas equally; an axial discharge gap is provided between the upstream end of each of the 2N fins and the tail end of the central cathode; and the tail ends of the 2N fins all extend from the tail end of the discharge chamber.

The 2N discharge areas are in one-to-one correspondence with the N electronegative working medium gas supply pipes and the N working medium gas supply pipes, where the discharge areas corresponding to the N electronegative working medium gas supply pipes are called negative discharge areas, and the discharge areas corresponding to the N working medium gas supply pipes are called positive discharge areas; the N electronegative working medium gas supply pipes are configured to supply an electronegative working medium gas I to the N negative discharge areas, and the N working medium gas supply pipes are configured to supply an electronegative working medium gas II or non-electronegative working medium gas to the N positive discharge areas; and the electronegativity of the electronegative working medium gas II is less than that of the electronegative working medium gas I.

The grid system includes a bias power supply and 2N fan-shaped grids that are all connected to the bias power supply and arranged at the tail ends of the 2N discharge areas, where the fan-shaped grids corresponding to the negative discharge areas are called negative fan-shaped grids, and the fan-shaped grids corresponding to the positive discharge areas are called positive fan-shaped grids; and the bias power supply can apply a positive bias to each of the negative fan-shaped grids, and can also apply a negative bias to each of the positive fan-shaped grids.

The gas supply assembly further includes an electronegative working medium gas source and a conventional working medium gas source.

The electronegative working medium gas source is filled with the electronegative working medium gas I; and the conventional working medium gas source is filled with the electronegative working medium gas II or non-electronegative working medium gas.

Each of the electronegative working medium gas supply pipes is connected to the electronegative working medium gas source through a valve I; and each of the working medium gas supply pipes is connected to the conventional working medium gas source through a valve II.

N=3 or 4.

The discharge chamber includes a small cylindrical chamber, a transitional frustum chamber and a large cylindrical chamber arranged successively in the axial direction; where the outer diameter of the small cylindrical chamber is less than that of the large cylindrical chamber.

The 2N fins are all located in the transitional frustum chamber and the large cylindrical chamber, and the outer end of each of the fins is hermetically connected to the inner walls of the transitional frustum chamber and the large cylindrical chamber; and the tail end of the central cathode is located inside the small cylindrical chamber.

The tail ends of the N electronegative working medium gas supply pipes all pass through the small cylindrical chamber and then extend into the N negative discharge areas; and the N working medium gas supply pipes all pass through the small cylindrical chamber and then extend into the N positive discharge areas.

The steel magnetic assembly includes cathode-end magnetic steel, column-section magnetic steel and grid-end magnetic steel, where the cathode-end magnetic steel is coaxially arranged in a shell of the small cylindrical chamber on the periphery of the central cathode; the column-section magnetic steel is coaxially embedded in the upstream end of a shell of the large cylindrical chamber, and the grid-end magnetic steel is coaxially embedded in the downstream end of the shell of the large cylindrical chamber and adjacent to the fan-shaped grids.

The Kaufman ion thruster further includes a magnetic filter device coaxially sleeved on the periphery of the middle of the large cylindrical chamber.

Each of the fan-shaped grids includes a fan-shaped screen grid and an accelerating fan-shaped grid that are successively arranged in parallel in the axial direction; and an insulating mica sheet is arranged between an outer edge of the fan-shaped screen grid and an outer edge of the accelerating fan-shaped grid.

In a use method of the thrust-quantitatively-controllable and self-neutralizable Kaufman ion thruster, the orbit control and attitude adjustment of the Kaufman ion thruster can be achieved by controlling gas supply starting timings of the N electronegative working medium gas supply pipes and the N working medium gas supply pipes.

An orbit control method of the Kaufman ion thruster includes the following steps.

Step 1-1: combination of symmetrical discharge areas: a positive discharge area and a negative discharge area that are symmetrical about the axis of the discharge chamber are called a set of symmetrical discharge areas; an electronegative working medium gas supply pipe and a working medium gas supply pipe that correspond to each set of symmetrical discharge areas form a set of symmetrical gas supply pipes; and a positive fan-shaped grid and a negative fan-shaped grid that correspond to each set of symmetrical discharge areas form a set of symmetrical grids; thus, the discharge chamber has N sets of symmetrical discharge areas, and the gas supply assembly has N sets of symmetrical gas supply pipes; and the grid system has N sets of symmetrical grids.

Step 1-2: selection of the number of starting sets of symmetrical gas supply pipes: according to the magnitude of a total thrust F required for the orbit control of the Kaufman ion thruster, the number of starting sets K of symmetrical gas supply pipes is selected, where the number of starting sets K is proportional to the magnitude of the total thrust F, and $1 \leq K \leq N$;

Step 1-3: starting of gas supply: the K sets of symmetrical gas supply pipes selected in step 1-2 are started synchronously; and each set of symmetrical gas supply pipes supplies gas to the corresponding positive discharge area or negative discharge area according to a preset same fixed flow, where the electronegative working medium gas supply pipe in the symmetrical gas supply pipes will supply an electronegative working medium gas I to the corresponding negative discharge area, and the working medium gas supply pipe in the symmetrical gas supply pipes will supply an electronegative working medium gas II or non-electronegative working medium gas to the corresponding positive discharge area.

Step 1-4: starting of K sets of symmetrical grids: during the starting of gas supply in step 1-3, the bias power supply in the grid system will supply biases to the K sets of symmetrical grids; where the K sets of symmetrical grids correspond to the axial positions of the K sets of symmetrical gas supply pipes selected in step 1-2; and the bias power supply applies a positive bias to each of the negative fan-shaped grids in the K sets of symmetrical grids, and applies a negative bias to each of the positive fan-shaped grids in the K sets of symmetrical grids.

Step 1-5: formation of plasma: the central cathode starts to emit primary electrons, and the primary electrons uniformly enter the 2N discharge areas; and the primary electrons entering K sets of symmetrical discharge areas will collide with the working medium gas supplied by the symmetrical gas supply pipes to produce plasma; where the primary electrons collide with the electronegative working medium gas I supplied by the electronegative working medium gas supply pipe to produce "electron-ion" plasma, and "ion-ion" plasma containing positive and negative ions is produced downstream of the negative discharge area; the primary electrons collide with the electronegative working medium gas II or non-electronegative working medium gas supplied by the working medium gas supply pipe to produce "electron-ion" plasma, and "ion-ion" plasma containing positive and negative ions is produced downstream of the positive discharge area; where a negative ion density in the "ion-ion" plasma downstream of the negative discharge area is higher than that in the "ion-ion" plasma downstream of the positive discharge area; the K sets of symmetrical discharge areas correspond to the axial positions of the K sets of symmetrical gas supply pipes selected in step 1-2; and the primary electrons entering the remaining N-K sets of symmetrical discharge areas will be collected by the wall surfaces of the corresponding discharge areas.

Step 1-6: extraction and acceleration of plasma: the negative fan-shaped grids in the K sets of symmetrical grids will extract and accelerate the negative ions in the plasma emitted from the tail ends of the negative discharge areas, and the accelerated negative ions will generate a component thrust F1 on the Kaufman ion thruster; and the positive fan-shaped grids in the K sets of symmetrical grids will extract and accelerate the positive ions in the plasma emitted from the tail ends of the positive discharge areas, and the accelerated positive ions will generate a component thrust F2 on the Kaufman ion thruster.

Step 1-7: neutralization of ion beam currents: the negative and positive ions after being accelerated by each set of symmetrical grids achieve self-neutralization.

Step 1-8: orbit control: during the neutralization of ion beam currents, the sum of all the component thrusts F1 and the component thrusts F2 will form a total axial thrust F that passes the center of mass of the Kaufman ion thruster and thus can be used for orbit control.

An attitude adjustment method of the Kaufman ion thruster includes the following steps.

Step 2-1: combination of eccentric discharge areas: a positive discharge area and a negative discharge area that are adjacent to each other are called a set of eccentric discharge areas; therefore, the 2N discharge areas will respectively form a first set, a second set, a third set, . . . a (N-1)th set of eccentric discharge areas clockwise or counterclockwise; an electronegative working medium gas supply pipe and a working medium gas supply pipe that correspond to each set of eccentric discharge areas are called a set of eccentric gas supply pipes; and a positive fan-shaped grid and a negative fan-shaped grid that correspond to each set of eccentric discharge areas are called a set of eccentric grids.

Step 2-2: selection of J sets of eccentric gas supply pipes: a rotational thrust torque M required for attitude adjustment is calculated according to a current attitude and an adjusted attitude of the Kaufman ion thruster, and then the number of starting sets J of eccentric gas supply pipes is selected and the circumferential positions of the J sets of eccentric gas supply pipes are selected, where, $1 \leq J \leq N-1$; the eccentric discharge areas corresponding to the axial positions of the J sets of eccentric gas supply pipes are called J sets of eccentric discharge areas; and the eccentric grids corresponding to the axial positions of the J sets of eccentric gas supply pipes are called J sets of eccentric grids.

Step 2-3: starting of gas supply: the J sets of eccentric gas supply pipes selected in step 2-2 are started synchronously; and each set of eccentric gas supply pipes supplies gas to the corresponding positive discharge area or negative discharge area according to a preset fixed flow, where the electronegative working medium gas supply pipe in the eccentric gas supply pipes will supply the electronegative working medium gas I to the corresponding negative discharge area, and the working medium gas supply pipe in the eccentric gas supply pipes will supply the electronegative working medium gas II or non-electronegative working medium gas to the corresponding positive discharge area.

Step 2-4: starting of the J sets of eccentric grids: during the starting of gas supply in step 1-3, the bias power supply in the grid system will supply biases to the J sets of eccentric grids; where the bias power supply applies a positive bias to each of the negative fan-shaped grids in the J sets of eccentric grids, and applies a negative bias to each of the positive fan-shaped grids in the J sets of eccentric grids.

Step 2-5: formation of plasma: the central cathode starts to emit primary electrons, and the primary electrons uniformly enter the 2N discharge areas; and the primary electrons entering the J sets of eccentric discharge areas will collide with the working medium gas supplied by the eccentric gas supply pipes to produce plasma; where the primary electrons collide with the electronegative working medium gas I supplied by the electronegative working medium gas supply pipe to produce "electron-ion" plasma, and "ion-ion" plasma containing positive and negative ions is produced downstream of the negative discharge area; the primary electrons collide with the electronegative working medium gas II or non-electronegative working medium gas supplied by the working medium gas supply pipe to produce "electron-ion" plasma, and "ion-ion" plasma containing positive and negative ions is produced downstream of the positive discharge area; where a negative ion density in the "ion-ion" plasma downstream of the negative discharge area is higher than that in the "ion-ion" plasma downstream of the positive discharge area; and the primary electrons entering the remaining N-J sets of eccentric discharge areas will be collected by the wall surfaces of the corresponding discharge areas.

Step 2-6: extraction and acceleration of plasma: the negative fan-shaped grids in the J sets of eccentric grids will extract and accelerate the negative ions in the plasma emitted from the tail ends of the negative discharge areas, and the accelerated negative ions will generate a component thrust F1' on the Kaufman ion thruster; and the positive fan-shaped grids in the J sets of eccentric grids will extract and accelerate the positive ions in the plasma emitted from the tail ends of the positive discharge areas, and the accelerated positive ions will generate a component thrust F2' on the Kaufman ion thruster.

Step 2-7: neutralization of ion beam currents: the negative and positive ions after being accelerated by each set of eccentric grids achieve self-neutralization.

Step 2-8: attitude adjustment: during the neutralization of ion beam currents, the sum of all the component thrusts F1' and the component thrusts F2' will generate a rotational thrust torque M on the center of mass of the Kaufman ion thruster, thereby achieving the attitude adjustment of the Kaufman ion thruster.

The present disclosure has the following beneficial effects:

1. The present disclosure can achieve self-neutralization without the need of neutralizers, thereby solving the problem of an increase in structural complexity caused by the neutralizers.
2. The present disclosure has center-oriented thrust modes and eccentric thrust modes, where the center-oriented thrust modes can be used for orbit control; and the eccentric thrust mode can be used for attitude adjustment. Therefore, the capability of solving the accurate thrust control of the Kaufman ion thruster is of great significance to the applications of the thruster to the accurate attitude and orbit control of such spacecrafts.
3. There are N center-oriented thrust modes and N-1 eccentric thrust modes in the present disclosure, where the thrust in each mode is different, and adjustment of the thrust magnitude of the Kaufman ion thruster is achieved by mode switching. In each mode, the flow of the working medium gas in each gas supply pipe remains unchanged, that is, the thrust of the Kaufman ion thruster does not depend on the flow change of the working medium gas, so that the plasma generation characteristics and ion beam current derivation characteristics of the discharge chamber will not be affected, thus achieving the accurate thrust control, which can be adapted to space missions such as gravitational wave detection and high-resolution earth observation and the like.

4. The size of each of the fan-shaped grids in the present disclosure is small, thus guaranteeing an increased stiffness, which can be adapted to a large-size discharge chamber, such that the research on large-diameter thrusters can be performed. In this way, the thrust can be significantly improved, which can be adapted to the research on large-thrust electric propulsion devices required for deep space exploration in the future.

DETAILED DESCRIPTION OF DISCLOSED EMBODIMENTS

The present disclosure will be further described in detail below with reference to the drawings and specific preferred embodiments.

In the description of the present disclosure, it is to be understood that the azimuthal or positional relations indicated by the terms "left", "right", "upper", "lower" and the like are azimuthal or positional relations based on the drawings, which are only for ease of description of the present disclosure and for simplicity of description, and not intended to indicate or imply that the referenced device or element must have a particular orientation and be constructed and operated in a particular orientation, and the terms "first" and "second" and the like do not indicate the importance of the parts, and therefore cannot be understood as a limitation of the present disclosure. The specific dimensions used in the present embodiments are intended only to illustrate the technical solutions, and do not limit the scope of protection of the present disclosure.

Figure 1:
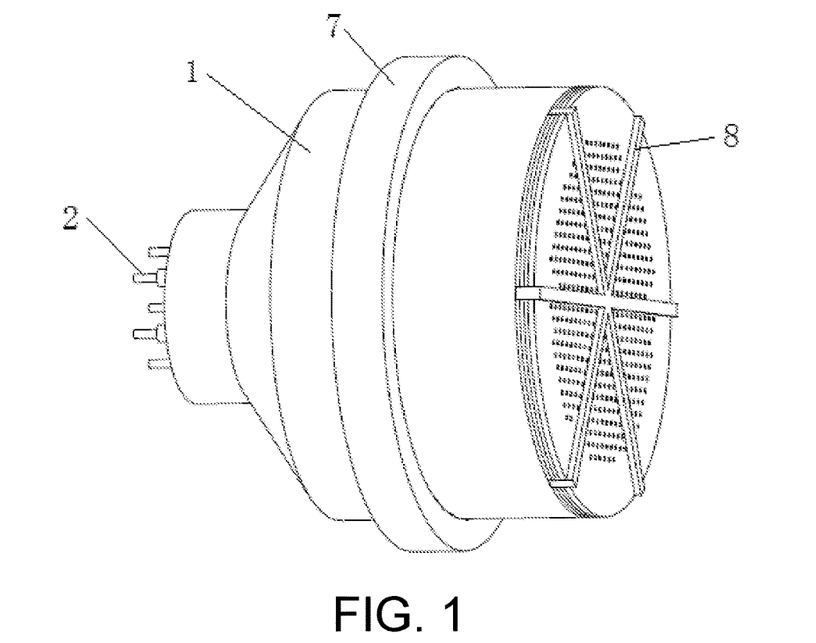
FIG. 1 shows an overall structure diagram I of a thrust-quantitatively-controllable and self-neutralizable Kaufman ion thruster according to the present disclosure.
Figure 2:
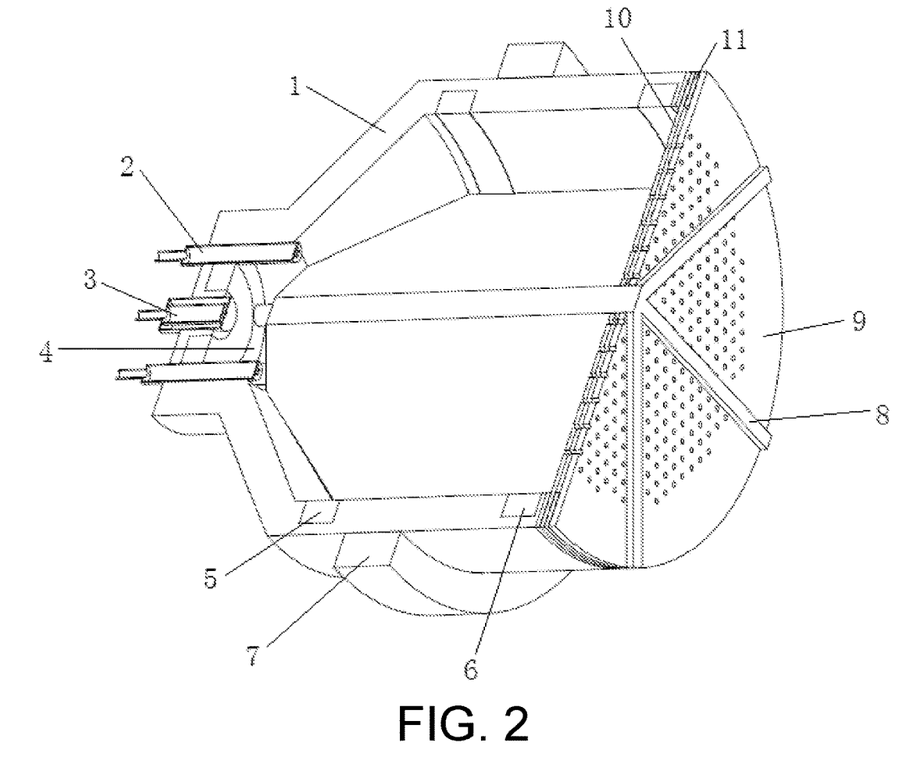
FIG. 2 shows an axial sectional view of the thrust-quantitatively-controllable and self-neutralizable Kaufman ion thruster according to the present disclosure.
Figure 3:
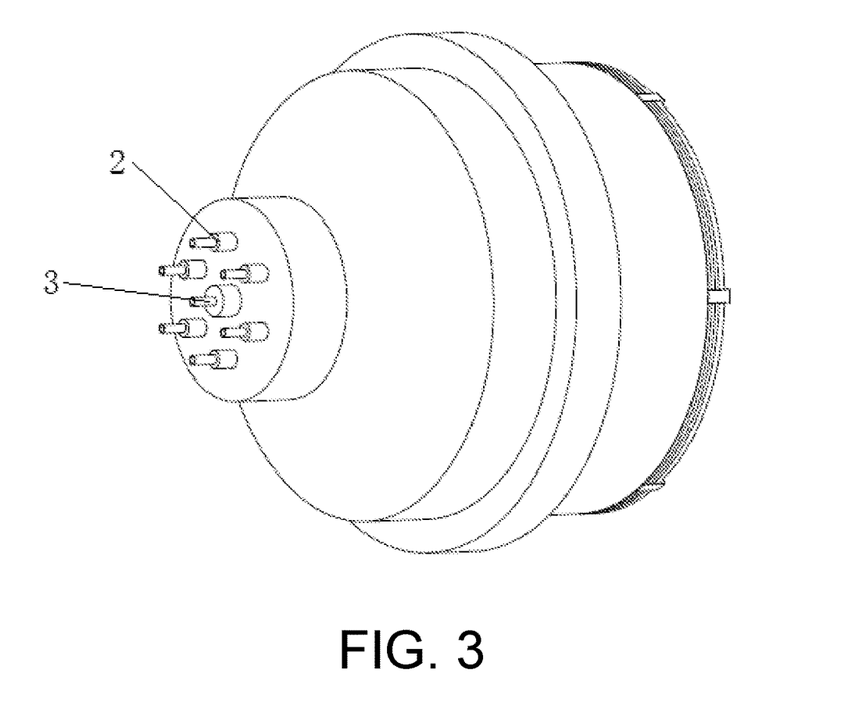
FIG. 3 shows an overall structure diagram II of the thrust-quantitatively-controllable and self-neutralizable Kaufman ion thruster according to the present disclosure.

As shown in FIGS. 1-3, a thrust-quantitatively-controllable and self-neutralizable Kaufman ion thruster includes a discharge chamber 1, a central cathode 3, a gas supply assembly, a steel magnetic assembly, a magnetic filter device 7, an insulating barrier 8 and a grid system.

The discharge chamber 1 is open at the tail end, and provided with a front panel at the front end. In the present embodiment, the discharge chamber 1 preferably includes a small cylindrical chamber, a transitional frustum chamber and a large cylindrical chamber arranged successively in the axial direction, where an outer diameter of the small cylindrical chamber is less than that of the large cylindrical chamber. Alternatively, the discharge chamber 1 can also be of other known shapes.

The central cathode 3 is coaxially inserted in the center of the front panel and can emit primary electrons to the discharge chamber 1, and the tail end of the central cathode 3 is preferably located in the small cylindrical chamber.

The gas supply assembly includes gas sources and 2N gas supply pipes 2, where the 2N gas supply pipes 2 are uniformly arranged on the front panel on the periphery of the central cathode 3, N≥2, N is preferably 3 or 4; if N is too small, a thrust magnitude adjustment mode will be limited, even an eccentric torque cannot be produced; and if N is too large, difficult manufacturing and an extremely complicated structure of the Kaufman ion thruster will be caused. In the present embodiment, a detailed description will be made with N=3 as an example.

The gas sources include an electronegative working medium gas source and a conventional working medium gas source.

The 2N gas supply pipes 2 include N electronegative working medium gas supply pipes and N working medium gas supply pipes which are arranged in a circumferentially staggering manner.

The electronegative working medium gas source is filled with an electronegative working medium gas I, and the conventional working medium gas source is filled with an electronegative working medium gas II or non-electronegative working medium gas. The electronegativity of the electronegative working medium gas II is less than that of the electronegative working medium gas I.

The electronegativity is a characteristic that molecules easily absorb free electrons to form negative ions, and the electronegative gas refers to a gas that has an obvious ability of capturing free electrons to form negative ions and preventing the formation of discharge.

Each of the electronegative working medium gas supply pipes is preferably connected to the electronegative working medium gas source through a valve I; the electronegative working medium gas source can provide to the N electronegative working medium gas supply pipes the electronegative working medium gas I such as $SF_6$, $I_2$, $C_{60}$ or $C_{78}$ and the like, in the present embodiment, preferably $C_{60}$ which is a gas at high temperature, or low temperature and low pressure.

Each of the working medium gas supply pipes is preferably connected to the conventional working medium gas source through a valve II. The conventional working medium gas source can supply to the N working medium gas supply pipes the electronegative working medium gas II or non-electronegative working medium gas such as xenon Xe and Krypton Kr.

The steel magnetic assembly is configured such that a ring cusp field is formed in the discharge chamber 1, and preferably includes cathode-end magnetic steel 4, column-section magnetic steel 5 and grid-end magnetic steel 6, where the cathode-end magnetic steel 4 is coaxially arranged in a shell of the small cylindrical chamber on the periphery of the central cathode 3; and the column-section magnetic steel 5 is coaxially embedded in the upstream end of a shell of the large cylindrical chamber, and the grid-end magnetic steel 6 is coaxially embedded in the downstream end of the shell of the large cylindrical chamber and adjacent to the fan-shaped grids.

The magnetic filter device 7 is coaxially sleeved on the periphery of the middle of the large cylindrical chamber, and preferably located on the periphery of the shell of the large cylindrical chamber between the column-section magnetic steel 5 and the grid-end magnetic steel 6. The magnetic filter device 7 can confine the electrons in the plasma upstream of the discharge chamber 1.

The insulating barrier 8 is preferably made of ceramics, and includes a central connecting rod and 2N fins.

The central connecting rod is coaxially inserted in the discharge chamber 1, preferably inserted in the transitional frustum chamber and the large cylindrical chamber, and an axial gap is preferably provided between the upstream end of the central connecting rod and the tail end of the central cathode 3.

The 2N fins are uniformly arranged along the circumference of the central connecting rod, and divide the discharge chamber 1 into 2N discharge areas equally. The 2N discharge areas are in one-to-one correspondence with the N electronegative working medium gas supply pipes and the N working medium gas supply pipes, where the discharge areas corresponding to the N electronegative working medium gas supply pipes are called negative discharge areas, and the discharge areas corresponding to the N working medium gas supply pipes are called positive discharge areas.

Figure 4:
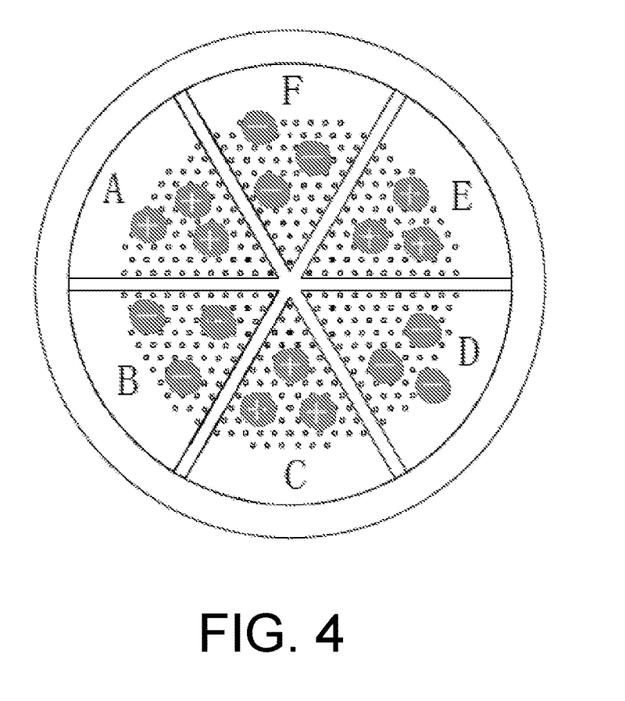
FIG. 4 shows a schematic diagram of area partition of a discharge chamber and grids in the present disclosure.

As shown in FIG. 4, six discharge areas (N=3 for example) are respectively A, B, C, D, E and F arranged counterclockwise, where A, C and E are the positive discharge areas; and B, D and F are the negative discharge areas.

The tail ends of the N electronegative working medium gas supply pipes all pass through the small cylindrical chamber and then extend into the N negative discharge areas, to supply the electronegative working medium gas I to the N negative discharge areas.

The N working medium gas supply pipes all pass through the small cylindrical chamber and then extend into the N positive discharge areas, to supply the electronegative working medium gas II or non-electronegative working medium gas to the N positive discharge areas.

The 2N fins are all located in the transitional frustum chamber and the large cylindrical chamber, and an axial discharge gap is provided between the upstream end of each of the 2N fins and the tail end of the central cathode 3; the outer end of each of the 2N fins is hermetically connected to the inner walls of the transitional frustum chamber and the large cylindrical chamber; and the tail end of each of the 2N fins extends from the tail end of the discharge chamber 1 for the subsequent installation of fan-shaped grids.

The grid system includes a bias power supply and 2N fan-shaped grids that are all connected to the bias power supply, where the 2N fan-shaped grids are arranged at the tail ends of the 2N discharge areas and are mounted on two adjacent fins, where, the fan-shaped grids corresponding to the negative discharge areas are called negative fan-shaped grids, and the fan-shaped grids corresponding to the positive discharge areas are called positive fan-shaped grids; and the bias power supply can apply a positive bias to each of the negative fan-shaped grids, and can also apply a negative bias to each of the positive fan-shaped grids.

Each of the fan-shaped grids includes a fan-shaped screen grid 10 and an accelerating fan-shaped grid 9 that are successively arranged in parallel in the axial direction; and a ceramic high-temperature-resistant insulating medium such as an insulating mica sheet 11 is arranged between an outer edge of the fan-shaped screen grid 10 and an outer edge of the accelerating fan-shaped grid 9.

In a use method of the thrust-quantitatively-controllable and self-neutralizable Kaufman ion thruster, the orbit control and attitude adjustment of the Kaufman ion thruster can be achieved by controlling gas supply starting timings of the N electronegative working medium gas supply pipes and the N working medium gas supply pipes.

A: Center-Oriented Thrust Mode-Orbit Control

An orbit control method of the Kaufman ion thruster preferably includes the following steps.

Step 1-1: combination of symmetrical discharge areas: a positive discharge area and a negative discharge area that are symmetrical about the axis of the discharge chamber 1 are called a set of symmetrical discharge areas; an electronegative working medium gas supply pipe and a working medium gas supply pipe that correspond to each set of symmetrical discharge areas form a set of symmetrical gas supply pipes; and a positive fan-shaped grid and a negative fan-shaped grid that correspond to each set of symmetrical discharge areas form a set of symmetrical grids; thus, the discharge chamber 1 has N sets of symmetrical discharge areas, and the gas supply assembly has N sets of symmetrical gas supply pipes; and the grid system has N sets of symmetrical grids.

In the present embodiment, the N sets of symmetrical gas supply pipes correspond to N center-oriented thrust modes.

Step 1-2: selection of the number of starting sets of symmetrical gas supply pipes: according to the magnitude of a total thrust F required for the orbit control of the Kaufman ion thruster, the number of starting sets K of symmetrical gas supply pipes is selected, where the number of starting sets K is proportional to the magnitude of the total thrust F, and $1 \leq K \leq N$. In the present embodiment, a detailed description is made with K=1, i.e., the minimum total thrust F, as an example.

Step 1-3: starting of gas supply: the K sets of symmetrical gas supply pipes selected in step 1-2 are started synchronously, and in the present embodiment, a detailed description is made with the starting of the symmetrical gas supply pipes corresponding to the positive discharge area A and the negative discharge area D as an example.

Each set of symmetrical gas supply pipes supplies gas to the corresponding positive discharge area or negative discharge area according to a preset same fixed flow, where the electronegative working medium gas supply pipe in the symmetrical gas supply pipes will preferably supply an electronegative working medium gas I, $C_{60}$, to the corresponding negative discharge area, and the working medium gas supply pipe in the symmetrical gas supply pipes will preferably supply a working medium gas, Xe, to the corresponding positive discharge area. The fixed flows of the electronegative working medium gas supply pipe and the working medium gas supply pipe in each set of symmetrical gas supply pipes are different, the fixed flows of all the electronegative working medium gas supply pipes are the same, and the fixed flows of all the working medium gas supply pipes are the same.

Step 1-4: starting of K sets of symmetrical grids: during the starting of gas supply in step 1-3, the bias power supply in the grid system will supply biases to the K sets of symmetrical grids, where the K sets of symmetrical grids correspond to the axial positions of the K sets of symmetrical gas supply pipes selected in step 1-2; and the bias power supply applies a positive bias to each of the negative fan-shaped grids in the K sets of symmetrical grids, and applies a negative bias to each of the positive fan-shaped grids in the K sets of symmetrical grids.

In the present embodiment, for ease of operation, a master switch is preferably provided for a gas supply pipeline valve and a fan-shaped grid power supply in a same discharge area.

Step 1-5: formation of plasma

The central cathode 3 starts to emit primary electrons, and the primary electrons uniformly enter the 2N discharge areas.

The primary electrons entering the K sets of symmetrical discharge areas will collide with the working medium gas supplied by the symmetrical gas supply pipes to produce plasma. The K sets of symmetrical discharge areas, i.e., the positive discharge area A and the negative discharge area D, corresponds to the axial positions of the K sets of symmetrical gas supply pipes selected in steps 1-2.

The primary electrons in the negative discharge area D and the electronegative working medium gas I, $C_{60}$, supplied by the electronegative working medium gas supply pipe will collide with each other upstream of the discharge chamber 1 to produce "electron-ion" plasma.

The magnetic filter device 7 confines the electrons in the plasma upstream of the discharge chamber 1, and there are high-energy electrons and low-energy electrons in the plasma, where the high-energy electrons are used to increase the positive ion density, while the low-energy electrons can be combined with neutral particles to increase the negative ion number density, so that the negative ion number density in a downstream area of the discharge chamber 1 is far higher than that of the electrons, thereby forming "ion-ion" plasma. In the present embodiment, since $C_{60}$ is an electronegative working medium gas, the low-energy electrons in the "electron-ion" plasma are strongly bound to neutral atoms in $C_{60}$, so negative ion plasma $C_{60-}$ is generated downstream of the negative discharge area D, that is, the density of $C_{60-}$ downstream of the negative discharge area D is high.

The primary electrons in the positive discharge area A and the working medium gas, Xe, supplied by the working medium gas supply pipe will collide with each other upstream of the discharge chamber 1 to produce "electron-ion" plasma.

Since Xe is a non-strongly-electronegative propellant (having an electronegativity less than that of the electronegative working medium gas I), the electrons in the "electron-ion" plasma are weakly bound to neutral atoms in Xe, so the density of $Xe^+$ downstream of the positive discharge area A is high.

The primary electrons entering the remaining N-K sets of symmetrical discharge areas (i.e., the discharge areas B, C, E and F) will be collected by the wall surfaces of the corresponding discharge areas.

Step 1-6: extraction and acceleration of plasma

The negative fan-shaped grids in the K sets of symmetrical grids will extract and accelerate the negative ions in the plasma emitted from the tail ends of the negative discharge areas. In the present embodiment, a negative bias is applied to the grids in the positive discharge area A to extract and accelerate $Xe^+$; and a positive bias is applied in the negative discharge area D to extract and accelerate $C_{60-}$.

The accelerated negative ions will generate a component thrust F1 on the Kaufman ion thruster; and the positive fan-shaped grids in the K sets of symmetrical grids will extract and accelerate the positive ions in the plasma emitted from the tail ends of the positive discharge areas, and the accelerated positive ions will generate a component thrust F2 on the Kaufman ion thruster.

Step 1-7: neutralization of ion beam currents: the negative and positive ions after being accelerated by each set of symmetrical grids achieve self-neutralization by use of existing proportional-integral-derivative control of the magnitude of positive and negative ion beam currents.

Step 1-8: orbit control: during the neutralization of ion beam currents, the sum of all the component thrusts F1 and the component thrusts F2 will form a total axial thrust F that passes the center of mass of the Kaufman ion thruster and thus can be used for orbit control.

At this time, the total thrust F passes the center of mass, and the sum of thrust torques of the positive discharge area A and the negative discharge area D is 0, so only an axial thrust is provided, which can be used for orbit control. The other several center-oriented thrust modes are similar in working principle, and thus will not be detailed.

B. Eccentric Thrust Mode-Attitude Adjustment

An attitude adjustment method of the Kaufman ion thruster preferably includes the following steps.

Step 2-1: combination of eccentric discharge areas: a positive discharge area and a negative discharge area that are adjacent to each other are called a set of eccentric discharge areas; therefore, the 2N discharge areas will respectively form a first set, a second set, a third set, . . . a (N−1)th set of eccentric discharge areas clockwise or counterclockwise; an electronegative working medium gas supply pipe and a working medium gas supply pipe that correspond to each set of eccentric discharge areas are called a set of eccentric gas supply pipes; and a positive fan-shaped grid and a negative fan-shaped grid that correspond to each set of eccentric discharge areas are called a set of eccentric grids.

Step 2-2: selection of J sets of eccentric gas supply pipes: a rotational thrust torque M required for attitude adjustment is calculated according to a current attitude and an adjusted attitude of the Kaufman ion thruster, and then the number of starting sets J of eccentric gas supply pipes is selected and the circumferential positions of the J sets of eccentric gas supply pipes are selected, where, $1 \leq J \leq N-1$; the eccentric discharge areas corresponding to the axial positions of the J sets of eccentric gas supply pipes are called J sets of eccentric discharge areas; and the eccentric grids corresponding to the axial positions of the J sets of eccentric gas supply pipes are called J sets of eccentric grids.

In the present embodiment, a detailed description is made with J=1 as an example, and N−1 eccentric thrust modes are correspondingly provided in the present disclosure.

Step 2-3: starting of gas supply: the J sets of eccentric gas supply pipes selected in step 2-2 are started synchronously; and each set of eccentric gas supply pipes supplies gas to the corresponding positive discharge area or negative discharge area according to a preset fixed flow, where the electronegative working medium gas supply pipe in the eccentric gas supply pipes will supply the electronegative working medium gas I to the corresponding negative discharge area, and the working medium gas supply pipe in the eccentric gas supply pipes will supply the electronegative working medium gas II or non-electronegative working medium gas to the corresponding positive discharge area, where the fixed flows of the electronegative working medium gas supply pipe and the working medium gas supply pipe in each set of eccentric gas supply pipes are different, the fixed flows of all the electronegative working medium gas supply pipes are the same, and the fixed flows of all the working medium gas supply pipes are the same.

In the present embodiment, a detailed description will be made with the starting of the eccentric gas supply pipes corresponding to the positive discharge area A and the negative discharge area B as an example.

Step 2-4: starting of the J sets of eccentric grids: during the starting of gas supply in step 1-3, the bias power supply in the grid system will supply biases to the J sets of eccentric grids;

where the bias power supply applies a positive bias to each of the negative fan-shaped grids in the J sets of eccentric grids, and applies a negative bias to each of the positive fan-shaped grids in the J sets of eccentric grids.

Step 2-5: formation of plasma

The central cathode 3 starts to emit primary electrons, and the primary electrons uniformly enter the 2N discharge areas.

The primary electrons entering the J sets of eccentric discharge areas (i.e., the positive discharge area A and the negative discharge area B) will collide with the working medium gas supplied by the eccentric gas supply pipes to produce plasma.

The primary electrons in the negative discharge area B collide with the electronegative working medium gas I supplied by the electronegative working medium gas supply pipe to produce "electron-ion" plasma, and after the "electron-ion" plasma passes through the magnetic filter device 7, "ion-ion" plasma containing positive and negative ions is produced downstream of the negative discharge area. The specific principle is the same as that in step 1-5, which will not be described here.

The primary electrons in the positive discharge area A collide with the electronegative working medium gas II or non-electronegative working medium gas supplied by the working medium gas supply pipe to produce "electron-ion" plasma, and after the "electron-ion" plasma passes through the magnetic filter device 7, "ion-ion" plasma containing positive and negative ions is produced downstream of the positive discharge area, where, a negative ion density in the "ion-ion" plasma downstream of the negative discharge area is higher than that in the "ion-ion" plasma downstream of the positive discharge area.

The primary electrons entering the remaining N-J sets of eccentric discharge areas will be collected by the wall surfaces of the corresponding discharge areas.

Step 2-6: extraction and acceleration of plasma

The negative fan-shaped grids in the J sets of eccentric grids will extract and accelerate the negative ions in the plasma emitted from the tail ends of the negative discharge areas, and the accelerated negative ions will generate a component thrust F1' on the Kaufman ion thruster; and the positive fan-shaped grids in the J sets of eccentric grids will extract and accelerate the positive ions in the plasma emitted from the tail ends of the positive discharge areas, and the accelerated positive ions will generate a component thrust F2' on the Kaufman ion thruster.

Step 2-7: neutralization of ion beam currents: the negative and positive ions after being accelerated by each set of eccentric grids achieve self-neutralization.

Step 2-8: attitude adjustment: during the neutralization of ion beam currents, the sum of all the component thrusts F1' and the component thrusts F2' will generate a rotational torque M on the center of mass of the Kaufman ion thruster, thereby achieving the attitude adjustment of the Kaufman ion thruster.

At this time, the total thrust does not pass the center of mass, the total thrust has a torque M on the center of mass, and the torque sum of the positive discharge area A and the negative discharge area B is not 0, so that a rotational torque can be provided, and can be used for spacecraft attitude control. The working principles of the other several eccentric thrust modes are similar. The thrust regulation in the present disclosure does not depend on the flow change of the gas supply pipes, so that the thrust regulation is accurate, which can be adapted to the space missions such as gravitational wave detection or high-resolution earth observation and the like.

The above describes the preferred embodiment of the present disclosure in detail, however, the present disclosure is not limited to the specific details in the above embodiment, a variety of equivalent transformations can be made on the technical solution of the present disclosure within the scope of the technical conception of the present disclosure, and all these equivalent transformations fall within the scope of protection of the present disclosure.

What is claimed is:

1. A thrust-quantitatively-controllable and self-neutralizable Kaufman ion thruster, comprising a discharge chamber, a central cathode, a gas supply assembly, a steel magnetic assembly, an insulating barrier and a grid system, wherein
the discharge chamber is open at a tail end, and a front panel is set at a front end;
the central cathode is coaxially inserted in a center of the front panel;
the gas supply assembly comprises N electronegative working medium gas supply pipes and N working medium gas supply pipes, where N≥2;
the N electronegative working medium gas supply pipes and the N working medium gas supply pipes are arranged on the front panel on the periphery of the central cathode in a uniformly staggering manner;
the steel magnetic assembly is configured such that a ring cusp field is formed in the discharge chamber;
the insulating barrier comprises a central connecting rod and 2N fins; where the central connecting rod is coaxially inserted in the discharge chamber, and the 2N fins are uniformly arranged along the circumference of the central connecting rod, and divide the discharge chamber into 2N discharge areas equally; an axial discharge gap is provided between the upstream end of each of the 2N fins and the tail end of the central cathode; and all of the tail ends of the 2N fins are extend from the tail end of the discharge chamber;
the 2N discharge areas are in one-to-one correspondence with the N electronegative working medium gas supply pipes and the N working medium gas supply pipes, where the discharge areas corresponding to the N electronegative working medium gas supply pipes are called negative discharge areas, and the discharge areas corresponding to the N working medium gas supply pipes are called positive discharge areas; the N electronegative working medium gas supply pipes are configured to supply an electronegative working medium gas I to the N negative discharge areas, and the N working medium gas supply pipes are configured to supply an electronegative working medium gas II or non-electronegative working medium gas to the N positive discharge areas; and the electronegativity of the electronegative working medium gas II is less than that of the electronegative working medium gas I;
the grid system comprises a bias power supply and 2N fan-shaped grids that are all connected to the bias power supply and arranged at the tail ends of the 2N discharge areas, where the fan-shaped grids corresponding to the negative discharge areas are called negative fan-shaped grids, and the fan-shaped grids corresponding to the positive discharge areas are called positive fan-shaped grids; and the bias power supply can apply a positive bias to each of the negative fan-shaped grids, and can also apply a negative bias to each of the positive fan-shaped grids.

2. The thrust-quantitatively-controllable and self-neutralizable Kaufman ion thruster according to claim 1, wherein the gas supply assembly further comprises an electronegative working medium gas source and a conventional working medium gas source;
the electronegative working medium gas source is filled with the electronegative working medium gas I; and the conventional working medium gas source is filled with the electronegative working medium gas II or non-electronegative working medium gas; and each of the electronegative working medium gas supply pipes is connected to the electronegative working medium gas source through a valve I; and each of the working medium gas supply pipes is connected to the conventional working medium gas source through a valve II.

3. The thrust-quantitatively-controllable and self-neutralizable Kaufman ion thruster according to claim 1, wherein N=3 or 4.

4. The thrust-quantitatively-controllable and self-neutralizable Kaufman ion thruster according to claim 1, wherein the discharge chamber comprises a small cylindrical chamber, a transitional frustum chamber and a large cylindrical chamber arranged sequentially in the axial direction; where an outer diameter of the small cylindrical chamber is less than that of the large cylindrical chamber;

the 2N fins are all located in the transitional frustum chamber and the large cylindrical chamber, and the outer end of each of the fins is hermetically connected to the inner walls of the transitional frustum chamber and the large cylindrical chamber; the tail end of the central cathode is located in the small cylindrical chamber;

the tail ends of the N electronegative working medium gas supply pipes all pass through the small cylindrical chamber and then extend into the N negative discharge areas; and the N working medium gas supply pipes all pass through the small cylindrical chamber and then extend into the N positive discharge areas.

5. The thrust-quantitatively-controllable and self-neutralizable Kaufman ion thruster according to claim 4, wherein the steel magnetic assembly comprises a cathode-end magnetic steel, a column-section magnetic steel and a grid-end magnetic steel, where the cathode-end magnetic steel is coaxially arranged in a shell of the small cylindrical chamber on the periphery of the central cathode; the column-section magnetic steel is coaxially embedded in the upstream end of a shell of the large cylindrical chamber, and the grid-end magnetic steel is coaxially embedded in the downstream end of the shell of the large cylindrical chamber and adjacent to the fan-shaped grids.

6. The thrust-quantitatively-controllable and self-neutralizable Kaufman ion thruster according to claim 5, further comprising a magnetic filter device coaxially sleeved on the periphery of the middle of the large cylindrical chamber.

7. The thrust-quantitatively-controllable and self-neutralizable Kaufman ion thruster according to claim 1, wherein each of the fan-shaped grids comprises a fan-shaped screen grid and an accelerating fan-shaped grid that are successively arranged in parallel in the axial direction; and an insulating mica sheet is arranged between an outer edge of the fan-shaped screen grid and an outer edge of the accelerating fan-shaped grid.

8. A use method of the thrust-quantitatively-controllable and self-neutralizable Kaufman ion thruster according to claim 1, wherein the orbit control and attitude adjustment of the Kaufman ion thruster can be achieved by controlling gas supply starting timings of the N electronegative working medium gas supply pipes and the N working medium gas supply pipes.

9. The use method of the thrust-quantitatively-controllable and self-neutralizable Kaufman ion thruster according to claim 8, wherein an orbit control method of the Kaufman ion thruster comprises the following steps:

step 1-1: combination of symmetrical discharge areas: a positive discharge area and a negative discharge area that are symmetrical about the axis of the discharge chamber are called a set of symmetrical discharge areas; an electronegative working medium gas supply pipe and a working medium gas supply pipe that correspond to each set of symmetrical discharge areas form a set of symmetrical gas supply pipes; and a positive fan-shaped grid and a negative fan-shaped grid that correspond to each set of symmetrical discharge areas form a set of symmetrical grids; thus, the discharge chamber has N sets of symmetrical discharge areas, and the gas supply assembly has N sets of symmetrical gas supply pipes; and the grid system has N sets of symmetrical grids;

step 1-2: selection of the number of starting sets of symmetrical gas supply pipes: according to the magnitude of a total thrust F required for the orbit control of the Kaufman ion thruster, the number of starting sets K of symmetrical gas supply pipes is selected, where the number of starting sets K is proportional to the magnitude of the total thrust F, and $1 \leq K \leq N$;

step 1-3: starting of gas supply: the K sets of symmetrical gas supply pipes selected in step 1-2 are started synchronously; and each set of symmetrical gas supply pipes supplies gas to the corresponding positive discharge area or negative discharge area according to a preset same fixed flow, where the electronegative working medium gas supply pipe in the symmetrical gas supply pipes will supply an electronegative working medium gas I to the corresponding negative discharge area, and the working medium gas supply pipe in the symmetrical gas supply pipes will supply an electronegative working medium gas II or non-electronegative working medium gas to the corresponding positive discharge area;

step 1-4: starting of K sets of symmetrical grids: during the starting of gas supply in step 1-3, the bias power supply in the grid system will supply biases to the K sets of symmetrical grids; where the K sets of symmetrical grids correspond to the axial positions of the K sets of symmetrical gas supply pipes selected in step 1-2; and the bias power supply applies a positive bias to each of the negative fan-shaped grids in the K sets of symmetrical grids, and applies a negative bias to each of the positive fan-shaped grids in the K sets of symmetrical grids;

step 1-5: formation of plasma: the central cathode starts to emit primary electrons, and the primary electrons uniformly enter the 2N discharge areas; and the primary electrons entering K sets of symmetrical discharge areas will collide with the working medium gas supplied by the symmetrical gas supply pipes to produce plasma; where the primary electrons collide with the electronegative working medium gas I supplied by the electronegative working medium gas supply pipe to produce "electron-ion" plasma, and "ion-ion" plasma containing positive and negative ions is produced downstream of the negative discharge area; the primary electrons collide with the electronegative working medium gas II or non-electronegative working medium gas supplied by the working medium gas supply pipe to produce "electron-ion" plasma, and "ion-ion" plasma containing positive and negative ions is produced downstream of the positive discharge area; where a negative ion density in the "ion-ion" plasma downstream of the negative discharge area is higher than that in the "ion-ion" plasma downstream of the positive discharge area; the K sets of symmetrical discharge areas correspond to the axial positions of the K sets of symmetrical gas supply pipes selected in step 1-2; and the primary electrons entering the remaining N-K sets of symmetrical discharge areas will be collected by the wall surfaces of the corresponding discharge areas;

step 1-6: extraction and acceleration of plasma: the negative fan-shaped grids in the K sets of symmetrical grids will extract and accelerate the negative ions in the plasma emitted from the tail ends of the negative discharge areas, and the accelerated negative ions will generate a component thrust F1 on the Kaufman ion thruster; and the positive fan-shaped grids in the K sets of symmetrical grids will extract and accelerate the positive ions in the plasma emitted from the tail ends of the positive discharge areas, and the accelerated positive ions will generate a component thrust F2 on the Kaufman ion thruster;

step 1-7: neutralization of ion beam currents: the negative and positive ions after being accelerated by each set of symmetrical grids achieve self-neutralization; and step 1-8: orbit control: during the neutralization of ion beam currents, the sum of all the component thrusts F1 and the component thrusts F2 will form a total axial thrust F that passes the center of mass of the Kaufman ion thruster and thus can be used for orbit control.

10. The thrust-quantitatively-controllable and self-neutralizable Kaufman ion thruster according to claim 8, wherein an attitude adjustment method of the Kaufman ion thruster comprises the following steps:

step 2-1: combination of eccentric discharge areas: a positive discharge area and a negative discharge area that are adjacent to each other are called a set of eccentric discharge areas; therefore, the 2N discharge areas will respectively form a first set, a second set, a third set, . . . a (N−1)th set of eccentric discharge areas clockwise or counterclockwise; an electronegative working medium gas supply pipe and a working medium gas supply pipe that correspond to each set of eccentric discharge areas are called a set of eccentric gas supply pipes; and a positive fan-shaped grid and a negative fan-shaped grid that correspond to each set of eccentric discharge areas are called a set of eccentric grids;

step 2-2: selection of J sets of eccentric gas supply pipes: a rotational thrust torque M required for attitude adjustment is calculated according to a current attitude and an adjusted attitude of the Kaufman ion thruster, and then the number of starting sets J of eccentric gas supply pipes is selected and the circumferential positions of the J sets of eccentric gas supply pipes are selected, where, $1 \leq J \leq N-1$; the eccentric discharge areas corresponding to the axial positions of the J sets of eccentric gas supply pipes are called J sets of eccentric discharge areas; and the eccentric grids corresponding to the axial positions of the J sets of eccentric gas supply pipes are called J sets of eccentric grids;

step 2-3: starting of gas supply: the J sets of eccentric gas supply pipes selected in step 2-2 are started synchronously; and each set of eccentric gas supply pipes supplies gas to the corresponding positive discharge area or negative discharge area according to a preset fixed flow, where the electronegative working medium gas supply pipe in the eccentric gas supply pipes will supply the electronegative working medium gas I to the corresponding negative discharge area, and the working medium gas supply pipe in the eccentric gas supply pipes will supply the electronegative working medium gas II or non-electronegative working medium gas to the corresponding positive discharge area;

step 2-4: starting of the J sets of eccentric grids: during the starting of gas supply in step 2-3, the bias power supply in the grid system will supply biases to the J sets of eccentric grids; where the bias power supply applies a positive bias to each of the negative fan-shaped grids in the J sets of eccentric grids, and applies a negative bias to each of the positive fan-shaped grids in the J sets of eccentric grids;

step 2-5: formation of plasma: the central cathode starts to emit primary electrons, and the primary electrons uniformly enter the 2N discharge areas; and the primary electrons entering the J sets of eccentric discharge areas will collide with the working medium gas supplied by the eccentric gas supply pipes to produce plasma; where the primary electrons collide with the electronegative working medium gas I supplied by the electronegative working medium gas supply pipe to produce "electron-ion" plasma, and "ion-ion" plasma containing positive and negative ions is produced downstream of the negative discharge area; the primary electrons collide with the electronegative working medium gas II or non-electronegative working medium gas supplied by the working medium gas supply pipe to produce "electron-ion" plasma, and "ion-ion" plasma containing positive and negative ions is produced downstream of the positive discharge area; where a negative ion density in the "ion-ion" plasma downstream of the negative discharge area is higher than that in the "ion-ion" plasma downstream of the positive discharge area; and the primary electrons entering the remaining N-J sets of eccentric discharge areas will be collected by the wall surfaces of the corresponding discharge areas;

step 2-6: extraction and acceleration of plasma: the negative fan-shaped grids in the J sets of eccentric grids will extract and accelerate the negative ions in the plasma emitted from the tail ends of the negative discharge areas, and the accelerated negative ions will generate a component thrust F1' on the Kaufman ion thruster; and the positive fan-shaped grids in the J sets of eccentric grids will extract and accelerate the positive ions in the plasma emitted from the tail ends of the positive discharge areas, and the accelerated positive ions will generate a component thrust F2' on the Kaufman ion thruster;

step 2-7: neutralization of ion beam currents: the negative and positive ions after being accelerated by each set of eccentric grids achieve self-neutralization; and step 2-8: attitude adjustment: during the neutralization of ion beam currents, the sum of all the component thrusts F1' and the component thrusts F2' will generate a rotational thrust torque M on the center of mass of the Kaufman ion thruster, thereby achieving the attitude adjustment of the Kaufman ion thruster.

* * * * *